(12) United States Patent
Reevell (10) Patent No.: US 10,918,136 B2
(45) Date of Patent: Feb. 16, 2021

(54) AEROSOL-GENERATING DEVICE WITH ELECTRODES FOR MEASURING AN ELECTRICAL LOAD

(71) Applicant: Philip Morris Products S.A., Neuchatel (CH)

(72) Inventor: Tony Reevell, London (GB)

(73) Assignee: Philip Morris Products S.A., Neuchatel (CH)

( * ) Notice: Subject to any disclaimer, the term of this patent is extended or adjusted under 35 U.S.C. 154(b) by 301 days.

(21) Appl. No.: 15/759,023

(22) PCT Filed: Sep. 23, 2016

(86) PCT No.: PCT/EP2016/072761
§ 371 (c)(1),
(2) Date: Mar. 9, 2018

(87) PCT Pub. No.: WO2017/051006
PCT Pub. Date: Mar. 30, 2017

(65) Prior Publication Data
US 2019/0261684 A1 Aug. 29, 2019

(30) Foreign Application Priority Data
Sep. 24, 2015 (EP) .................................... 15186769

(51) Int. Cl.
*A24F 13/00* (2006.01)
*A24F 47/00* (2020.01)
(Continued)

(52) U.S. Cl.
CPC .......... *A24F 47/008* (2013.01); *A24B 15/167* (2016.11); *A24D 1/02* (2013.01);
(Continued)

(58) Field of Classification Search
CPC ....................................................... A24F 47/00
(Continued)

(56) References Cited

U.S. PATENT DOCUMENTS 3,860,012 A 1/1975 Selke
3,894,544 A 7/1975 Egri
(Continued)

FOREIGN PATENT DOCUMENTS

CN 1330563 A 1/2002
CN 104106844 A 10/2014
(Continued)

OTHER PUBLICATIONS

International Search Report and Written Opinion dated Jan. 23, 2017 in PCT/EP2016/072761 filed Sep. 23, 2016.
(Continued)

*Primary Examiner* — Phuong K Dinh
(74) *Attorney, Agent, or Firm* — Oblon, McClelland, Maier & Neustadt, L.L.P.

(57) ABSTRACT

An aerosol-generating device is provided, including a power supply; at least one heater; a cavity configured to receive an aerosol-generating article; a first electrode and a second electrode spaced apart from the first electrode such that at least a portion of the article is disposed between the first electrode and the second electrode when the article is received within the cavity; and a controller configured to control a supply of power from the power supply to the heater for heating the article when the article is received within the cavity, the controller being further configured to measure an electrical load between the first and second electrodes when the article is received within the cavity, and the controller being further configured to terminate the supply of power to the at least one heater when the measured electrical load exceeds a predetermined threshold.

14 Claims, 3 Drawing Sheets

(51) Int. Cl.
  *A24B 15/167* (2020.01)
  *A24D 1/02* (2006.01)
  *A24D 1/14* (2006.01)
  *G01N 27/04* (2006.01)
  *G01N 27/22* (2006.01)
  *H05B 1/02* (2006.01)

(52) U.S. Cl.
  CPC .............. *A24D 1/14* (2013.01); *G01N 27/045* (2013.01); *G01N 27/228* (2013.01); *H05B 1/0244* (2013.01)

(58) Field of Classification Search
  USPC .................................................. 131/328–329
  See application file for complete search history.

(56) References Cited

U.S. PATENT DOCUMENTS

| | | |
|---|---|---|
| 5,498,855 A | 3/1996 | Deevi et al. |
| 5,514,630 A | 5/1996 | Willkens et al. |
| 5,724,998 A | 3/1998 | Gellatly et al. |
| 2014/0096781 A1 | 4/2014 | Sears et al. |
| 2014/0290677 A1 | 10/2014 | Liu |
| 2014/0305449 A1 | 10/2014 | Plojoux et al. |
| 2015/0366266 A1 | 12/2015 | Chen |
| 2016/0157523 A1 | 6/2016 | Liu |
| 2016/0302488 A1 | 10/2016 | Fernando et al. |
| 2018/0049469 A1* | 2/2018 | Kaufman .............. A61M 15/06 |

FOREIGN PATENT DOCUMENTS

| | | |
|---|---|---|
| CN | 104703309 A | 6/2015 |
| GB | 285210 A | 2/1928 |
| GB | 983928 A | 2/1965 |
| JP | 11-346747 A | 12/1999 |
| JP | 2014-217379 A | 11/2014 |
| JP | 2015-524261 A | 8/2015 |
| JP | 2015-531235 A | 11/2015 |
| JP | 2016-513453 A | 5/2016 |
| JP | 2017-510270 A | 4/2017 |
| WO | WO 03/095688 A2 | 11/2003 |
| WO | WO 2011/160788 A1 | 12/2011 |
| WO | 2013/098395 A1 | 7/2013 |
| WO | 2015/015431 A1 | 2/2015 |
| WO | 2015/082560 A1 | 6/2015 |
| WO | 2015/140312 A1 | 9/2015 |

OTHER PUBLICATIONS

Combined Chinese Office Action and Search Report dated May 28, 2020, in Patent Application No. 201680051641.7 (with English translation), citing documents AO-AS therein, 16 pages.

Japanese Decision to Grant dated Oct. 26, 2020 in corresponding Japanese Patent Application No. 2018-515267 (with English translation), 4 pages.

* cited by examiner

Figure 5

AEROSOL-GENERATING DEVICE WITH ELECTRODES FOR MEASURING AN ELECTRICAL LOAD

TECHNICAL FIELD

The present invention relates to an aerosol-generating device comprising electrodes for measuring an electrical load.

DESCRIPTION OF THE RELATED ART

One type of aerosol-generating system is an electrically operated smoking system. Known handheld electrically operated smoking systems typically comprise an aerosol-generating device comprising a battery, control electronics and an electric heater for heating an aerosol-generating article designed specifically for use with the aerosol-generating device. In some examples, the aerosol-generating article comprises an aerosol-generating substrate, such as a tobacco rod or a tobacco plug, and the heater contained within the aerosol-generating device is inserted into or around the aerosol-generating substrate when the aerosol-generating article is inserted into the aerosol-generating device. In an alternative electrically operated smoking system, the aerosol-generating article may comprise a capsule containing an aerosol-generating substrate, such as loose tobacco.

Aerosol-generating substrates, such as tobacco, typically comprise one or more volatile compounds that form an aerosol when heated inside the aerosol-generating device. During continuous heating inside an aerosol-generating device the volatile compounds are depleted from the aerosol-generating substrate until the level of volatile compounds remaining within the aerosol-generating substrate may be insufficient to support adequate aerosol generation, which may lead to a diminished smoking experience for a consumer.

Accordingly, it would be desirable to provide an aerosol-generating device that enables monitoring of the levels of volatile compounds remaining in an aerosol-generating substrate during heating of the aerosol-generating substrate in the aerosol-generating device.

SUMMARY

According to a first aspect of the present invention there is provided an aerosol-generating device comprising a power supply, at least one heater, and a cavity for receiving an aerosol-generating article. The device further comprises a first electrode and a second electrode spaced apart from the first electrode so that at least a portion of an aerosol-generating article is received between the first electrode and the second electrode when an aerosol-generating article is received within the cavity. The device also comprises a controller for controlling a supply of power from the power supply to the at least one heater for heating an aerosol-generating article when an aerosol-generating article is received within the cavity. The controller is configured to measure an electrical load between the first electrode and the second electrode when an aerosol-generating article is received within the cavity, and to terminate the supply of power from the power supply to the at least one heater when the measured electrical load exceeds a predetermined threshold.

As used herein, the term "aerosol-generating article" refers to an article comprising an aerosol-generating substrate that, when heated, releases volatile compounds that can form an aerosol.

Aerosol-generating devices according to the present invention advantageously measure an electrical load across at least a portion of an aerosol-generating article when an aerosol-generating article is received between the first and second electrodes. Typically, when an aerosol-generating article is heated during use using the aerosol-generating device, volatile compounds in the aerosol-generating article evaporate. Evaporation of volatile compounds from the aerosol-generating article results in a change in the electrical load between the first and second electrodes. Therefore, the change in the measured electrical load between the first electrode and the second electrode can advantageously be used to give an indication of the amount of one or more volatile compounds remaining in the aerosol-generating article.

Using a measured electrical load to monitor the amount of one or more volatile compounds remaining in an aerosol-generating article advantageously facilitates the use of a heating cycle of length appropriate to the aerosol-generating article. Accordingly, the aerosol-generating device is configured to cease heating of the aerosol-generating article when the electrical load, or a change in the electrical load, reaches a predetermined threshold indicative of a substantial depletion of one or more volatile compounds from the aerosol-generating article. Preventing further heating of the aerosol-generating article when the one or more volatile compounds have been depleted from the aerosol-generating article may prevent the onset of a diminished smoking experience for a consumer. Preventing further heating of the aerosol-generating article when the one or more volatile compounds have been depleted from the aerosol-generating article may reduce the risk of accidental combustion of the aerosol-generating article due to overheating as the aerosol-generating article becomes dry.

The electrical load may comprise at least one of a resistive load and a capacitive load. Advantageously, resistive and capacitive loads can be measured without requiring complex electronics. Advantageously, the resistive or capacitive load of an aerosol-generating article typically changes in a predictable manner, which may facilitate accurate correlation between measured changes in the electrical load and the amount of depletion of one or more volatile compounds from the aerosol-generating article.

In any of the embodiments described above, the at least one heater may comprise an elongate heater configured for insertion into an aerosol-generating article when an aerosol-generating article is received within the cavity. The elongate heater may have any suitable shape to facilitate insertion into the aerosol-generating article. For example, the elongate heater may be a heater blade.

Additionally, or alternatively, the at least one heater may comprise a heater positioned adjacent to an outer surface of the aerosol-generating article when the aerosol-generating article is received within the cavity. The at least one heater may comprise a substantially annular heater configured to surround at least a portion of an aerosol-generating article when an aerosol-generating article is received within the cavity. Additionally, or alternatively, the at least one heater may comprise a substantially planar heater positioned adjacent to an end of an aerosol-generating article when an aerosol-generating article is received within the cavity.

As used herein, the terms 'inner' and 'outer' are used to refer to relative positions of components of the aerosol-generating device, or parts of components of the aerosol-generating device. For example, an inner surface of a component faces toward an interior of the device and an outer surface of a component faces toward the exterior of the device.

In any of the embodiments described above, at least one of the first electrode and the second electrode may form part of the at least one heater. Preferably, the first electrode forms part of the at least one heater and the second electrode is separate from and spaced apart from the first electrode and the at least one heater.

Such an arrangement may be particularly suited to embodiments in which the at least one heater comprises an elongate heater arranged for insertion into an aerosol-generating article when an aerosol-generating article is received within the cavity. In these embodiments, the first electrode preferably forms part of the elongate heater, and the second electrode is preferably provided on an inner surface of the cavity so that the second electrode is positioned between the inner surface of the cavity and an outer surface of an aerosol-generating article when an aerosol-generating article is received within the cavity.

Forming the first electrode as part of the at least one heater may reduce the number of components required to manufacture the aerosol-generating device. In some embodiments, the at least one heater comprises a resistive heater including a resistive heating element. In such embodiments, the first electrode may be separately provided on a common electrically insulating substrate. Alternatively, the resistive heating element may also form the first electrode, which may further simplify the construction of the aerosol-generating device.

In those embodiments in which the first electrode forms part of the at least one heater, and the at least one heater comprises an elongate heater arranged for insertion into an aerosol-generating article when an aerosol-generating article is received within the cavity, the second electrode preferably has a substantially annular shape so that the second electrode circumscribes at least a portion of an aerosol-generating article when an aerosol-generating article is received within the cavity.

As an alternative to forming one or both of the first and second electrodes as part of the at least one heater, the first and second electrodes may be provided on an inner surface of the cavity, wherein the first and second electrodes are positioned opposite each other so that when an aerosol-generating article is received within the cavity at least a portion of the aerosol-generating article is positioned between the first and second electrodes. Such an arrangement may be particularly suited to embodiments in which the at least one heater is not configured for insertion into an aerosol-generating article when an aerosol-generating article is received within the cavity. For example, providing first and second electrodes opposite each other and on an inner surface of the cavity may be particularly suited to embodiments in which the at least one heater is positioned adjacent an outer surface of an aerosol-generating article when an aerosol-generating article is received within the cavity. Therefore, the at least one heater may be provided on the inner surface of the cavity so that, during use, the at least one heater heats an outer surface of an aerosol-generating article received within the cavity.

In any of the embodiments described above, the at least one heater preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Examples of suitable composite heater elements are disclosed in U.S. Pat. No. 5,498,855, WO-A-03/095688 and U.S. Pat. No. 5,514,630.

The present invention also extends to the combination of the aerosol-generating device with an aerosol-generating article. Therefore, according to a second aspect of the present invention there is provided an aerosol-generating system comprising an aerosol-generating article and an aerosol-generating device according to the first aspect of the present invention, in accordance with any of the embodiments described above. The aerosol-generating article comprises an aerosol-generating substrate, wherein the aerosol-generating substrate is non-liquid at a temperature of 20 degrees Celsius. The aerosol-generating system is arranged so that at least a portion of the aerosol-generating substrate forms at least part of the electrical load and is received between the first and second electrodes when the aerosol-generating article is received within the cavity.

Preferably, the aerosol-generating substrate comprises tobacco.

The aerosol-generating substrate may be a dielectric material. In such embodiments, the electrical load measured by the controller is preferably a capacitive load.

The aerosol-generating substrate may be electrically conductive. In such embodiments, the electrical load measured by the controller is preferably a resistive load.

The aerosol-generating article may comprise a wrapper wrapped around the aerosol-generating substrate, wherein at least a portion of the wrapper forms part of the electrical load. In such embodiments, the wrapper may comprise a porous substrate material and a liquid sorbed into the porous substrate material. Providing a wrapper comprising a liquid sorbed into a porous substrate material may provide, at least in part, an electrical load between the first and second electrodes that varies during heating of the aerosol-generating article. That is, at least some of the liquid sorbed into the porous substrate may evaporate during heating of the aerosol-generating article.

Preferably, the wrapper comprises a paper sheet and at least one liquid sorbed onto the paper sheet. The solid components of the paper sheet form the porous substrate material. The liquid sorbed into the porous substrate material may comprise the residual moisture content of the paper after the paper has been formed using a conventional paper-making process, such as a wet-laying process. Additionally, or alternatively, a liquid may be added to the paper after the paper has been formed. The liquid may comprise water.

In any of the embodiments described above, the aerosol-generating substrate is preferably a solid aerosol-generating substrate. The aerosol-generating substrate preferably comprises a tobacco-containing material containing volatile tobacco flavour compounds which are released from the substrate upon heating. The aerosol-generating substrate may comprise a non-tobacco material. The aerosol-generating substrate may comprise tobacco-containing material and non-tobacco containing material.

The solid aerosol-generating substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-generating substrate may contain tobacco or non-tobacco volatile flavour compounds, which are released upon heating of the solid aerosol-generating substrate. The solid aerosol-generating substrate may also contain one or more capsules that, for example, include additional tobacco volatile flavour compounds or non-tobacco volatile flavour compounds and such capsules may melt during heating of the solid aerosol-generating substrate.

Optionally, the solid aerosol-generating substrate may be provided on or embedded in a thermally stable carrier. The carrier may take the form of powder, granules, pellets, shreds, strands, strips or sheets. The solid aerosol-generating substrate may be deposited on the surface of the carrier in the form of, for example, a sheet, foam, gel or slurry. The solid aerosol-generating substrate may be deposited on the entire surface of the carrier, or alternatively, may be deposited in a pattern in order to provide a non-uniform flavour delivery during use.

As used herein, the term 'homogenised tobacco material' denotes a material formed by agglomerating particulate tobacco.

As used herein, the term 'sheet' denotes a laminar element having a width and length substantially greater than the thickness thereof.

As used herein, the term 'gathered' is used to describe a sheet that is convoluted, folded, or otherwise compressed or constricted substantially transversely to a longitudinal axis of the aerosol-generating article.

In a preferred embodiment, the aerosol-generating substrate comprises a gathered textured sheet of homogenised tobacco material.

As used herein, the term 'textured sheet' denotes a sheet that has been crimped, embossed, debossed, perforated or otherwise deformed. The aerosol-generating substrate may comprise a gathered textured sheet of homogenised tobacco material comprising a plurality of spaced-apart indentations, protrusions, perforations or a combination thereof.

In a particularly preferred embodiment, the aerosol-generating substrate comprises a gathered crimped sheet of homogenised tobacco material.

Use of a textured sheet of homogenised tobacco material may advantageously facilitate gathering of the sheet of homogenised tobacco material to form the aerosol-generating substrate.

As used herein, the term 'crimped sheet' denotes a sheet having a plurality of substantially parallel ridges or corrugations. Preferably, the substantially parallel ridges or corrugations extend along or parallel to a longitudinal axis of the aerosol-generating article. This advantageously facilitates gathering of the crimped sheet of homogenised tobacco material to form the aerosol-generating article. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article.

As used herein, the term 'aerosol former' is used to describe any suitable known compound or mixture of compounds that, in use, facilitates formation of an aerosol and that is substantially resistant to thermal degradation at the operating temperature of the aerosol-generating article.

Suitable aerosol-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate Preferred aerosol formers are polyhydric alcohols or mixtures thereof, such as propylene glycol, triethylene glycol, 1,3-butanediol and, most preferred, glycerine.

The aerosol-generating substrate may comprise a single aerosol former. Alternatively, the aerosol-generating substrate may comprise a combination of two or more aerosol formers.

The aerosol-generating substrate may have an aerosol former content of greater than 5 percent on a dry weight basis.

The aerosol aerosol-generating substrate may have an aerosol former content of between approximately 5 percent and approximately 30 percent on a dry weight basis.

The aerosol-generating substrate may have an aerosol former content of approximately 20 percent on a dry weight basis.

In an alternative set of embodiments, the aerosol-generating article may comprise a capsule defining a compartment in which the aerosol-generating substrate is received. In such embodiments, it may be preferable to configure the controller to measure a capacitive load between the first and second electrodes, particularly in embodiments in which the capsule is formed from an electrically insulating material, such as a plastic.

The capsule may comprise a base, a substantially cylindrical wall extending from the base, and an open end opposite the base. Preferably, the aerosol-generating article further comprises a seal connected to the capsule and extending across the open end to seal the aerosol-generating substrate within the compartment. In such embodiments, the aerosol-generating device preferably comprises a piercing element arranged to pierce the seal when the aerosol-generating article is received within the cavity. In those embodiments in which the at least one heater comprises an elongate heater, the elongate heater may form the piercing element. Alternatively, a piercing element may be provided separately from the at least one heater.

In those embodiments in which the aerosol-generating article comprises a capsule defining a compartment in which the aerosol-generating substrate is received, preferably the aerosol-generating substrate comprises tobacco, more preferably at least one of pipe tobacco, cut filler, reconstituted tobacco, homogenised tobacco, and combinations thereof.

The aerosol-generating substrate may comprise an aerosol-former. The aerosol-generating substrate preferably comprises homogenised tobacco material, an aerosol-former and water. Providing homogenised tobacco material may improve aerosol generation, the nicotine content and the flavour profile of the aerosol generated during heating of the aerosol-generating article. Specifically, the process of making homogenised tobacco involves grinding tobacco leaf, which more effectively enables the release of nicotine and flavours upon heating.

The homogenised tobacco material is preferably provided in sheets which are one of folded, crimped, or cut into strips. In a particularly preferred embodiment, the sheets are cut into strips having a width of between about 0.2 millimetres and about 2 millimetres, more preferably between about 0.4 millimetres and about 1.2 millimetres. In one embodiment, the width of the strips is about 0.9 millimetres.

Alternatively, the homogenised tobacco material may be formed into spheres using spheronisation. The mean diameter of the spheres is preferably between about 0.5 millimetres and about 4 millimetres, more preferably between about 0.8 millimetres and about 3 millimetres.

The aerosol-generating substrate preferably comprises: homogenised tobacco material between about 55 percent and about 75 percent by weight; aerosol-former between about 15 percent and about 25 percent by weight; and water between about 10 percent and about 20 percent by weight.

Before measuring the samples of aerosol-generating substrate they are equilibrated for 48 hours at 50 percent relative humidity at 22 degrees Celsius. The Karl Fischer technique is used to determine the water content of the homogenised tobacco material.

The aerosol-generating substrate may further comprise a flavourant between about 0.1 percent and about 10 percent by weight. The flavourant may be any suitable flavourant known in the art, such as menthol.

Sheets of homogenised tobacco material for use in aerosol-generating articles comprising a capsule may be formed by agglomerating particulate tobacco obtained by grinding or otherwise comminuting one or both of tobacco leaf lamina and tobacco leaf stems.

Sheets of homogenised tobacco material for use in aerosol-generating articles comprising a capsule may comprise one or more intrinsic binders that is a tobacco endogenous binder, one or more extrinsic binders that is a tobacco exogenous binder, or a combination thereof to help agglomerate the particulate tobacco. Alternatively, or in addition, sheets of homogenised tobacco material may comprise other additives including, but not limited to, tobacco and non-tobacco fibres, flavourants, fillers, aqueous and non-aqueous solvents and combinations thereof.

Suitable extrinsic binders for inclusion in sheets of homogenised tobacco material for use in aerosol-generating articles comprising a capsule are known in the art and include, but are not limited to: gums such as, for example, guar gum, xanthan gum, arabic gum and locust bean gum; cellulosic binders such as, for example, hydroxypropyl cellulose, carboxymethyl cellulose, hydroxyethyl cellulose, methyl cellulose and ethyl cellulose; polysaccharides such as, for example, starches, organic acids, such as alginic acid, conjugate base salts of organic acids, such as sodium-alginate, agar and 30 pectins; and combinations thereof.

A number of reconstitution processes for producing sheets of homogenised tobacco materials are known in the art. These include, but are not limited to: paper-making processes of the type described in, for example, U.S. Pat. No. 3,860,012; casting or 'cast leaf' processes of the type described in, for example, U.S. Pat. No. 5,724,998; dough reconstitution processes of the type described in, for example, U.S. Pat. No. 3,894,544; and extrusion processes of the type described in, for example, in GB-A-983,928. Typically, the densities of sheets of homogenised tobacco material produced by extrusion processes and dough reconstitution processes are greater than the densities of sheets of homogenised tobacco materials produced by casting processes.

Sheets of homogenised tobacco material for use in aerosol-generating articles comprising a capsule are preferably formed by a casting process of the type generally comprising casting a slurry comprising particulate tobacco and one or more binders onto a conveyor belt or other support surface, drying the cast slurry to form a sheet of homogenised tobacco material and removing the sheet of homogenised tobacco material from the support surface.

The homogenised tobacco sheet material may be produced using different types of tobacco. For example, tobacco sheet material may be formed using tobaccos from a number of different varieties of tobacco, or tobacco from different regions of the tobacco plant, such as leaves or stem. After processing, the sheet has consistent properties and a homogenised flavour. A single sheet of homogenised tobacco material may be produced to have a specific flavour. To produce a product having a different flavour, a different tobacco sheet material needs to be produced. Some flavours that are produced by blending a large number of different shredded tobaccos in a conventional cigarette may be difficult to replicate in a single homogenised tobacco sheet. For example, Virginia tobaccos and Burley tobaccos may need to be processed in different ways to optimise their individual flavours. It may not be possible to replicate a particular blend of Virginia and Burley tobaccos in a single sheet of homogenised tobacco material. As such, the aerosol-generating substrate may comprise a first homogenised tobacco material and a second homogenised tobacco material. By combining two different sheets of tobacco material in a single aerosol-generating substrate, new blends may be created that could not be produced by a single sheet of homogenised tobacco.

The aerosol-former preferably comprises at least one polyhydric alcohol. In a preferred embodiment, the aerosol-former comprises at least one of: triethylene glycol; 1,3-butanediol; propylene glycol; and glycerine.

According to a third aspect of the present invention there is provided an aerosol-generating system comprising an aerosol-generating article and an aerosol-generating device according to the first aspect of the present invention, in accordance with any of the embodiments described above. The aerosol-generating article comprises an aerosol-generating substrate, the aerosol-generating substrate comprising at least one liquid and at least one solid. The aerosol-generating system is arranged so that at least a portion of the aerosol-generating substrate forms at least part of the electrical load and is received between the first and second electrodes when the aerosol-generating article is received within the cavity. The aerosol-generating article may comprise any of the optional or preferred features described herein with reference to the second aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
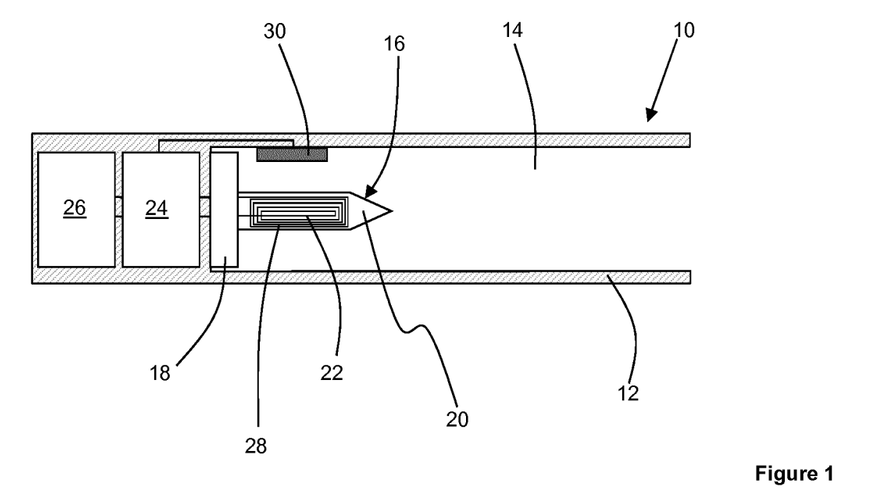
FIG. 1 shows an aerosol-generating device in accordance with the present invention.

FIG. 1 shows an aerosol-generating device 10 comprising a housing 12, the housing 12 defining a cavity 14 for receiving an aerosol-generating article. The device 10 includes a heater 16 comprising a base portion 18 and a heater blade 20 that penetrates an aerosol-generating article when the aerosol-generating article is inserted into the cavity 14. The heater blade 20 comprises a resistive heating coil 22 for resistively heating the upstream end of an aerosol-generating article inserted into the cavity 14. A controller 24 controls the operation of the device 10, including the supply of electrical current from a battery 26 to the resistive heating coil 22 of the heater blade 20.

The resistive heating coil 22 also forms a first electrode 28, and a second electrode 30 is provided on a surface of the cavity 14.

Figure 2:
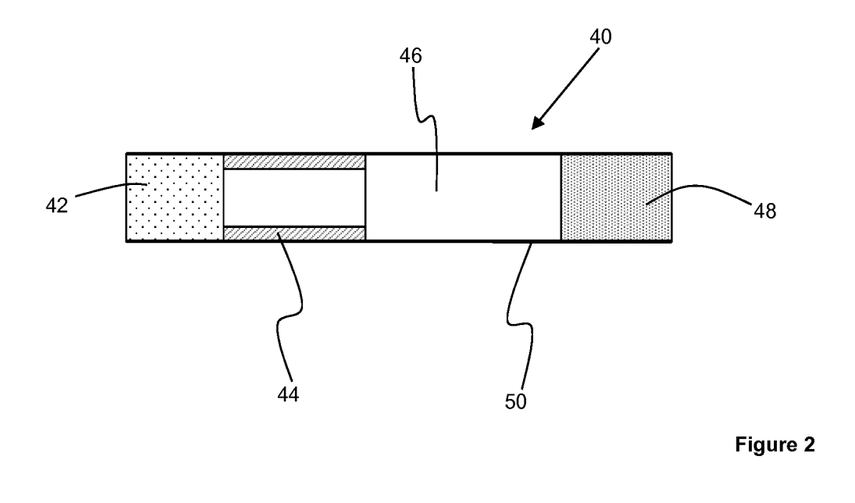
FIG. 2 shows an aerosol-generating article for use with the aerosol-generating device of FIG. 1.

FIG. 2 shows an aerosol-generating article 40 for use in the aerosol-generating device 10 of FIG. 1. The aerosol-generating article 40 comprises an aerosol-generating substrate 42, a hollow acetate tube 44, a polymeric filter 46, a mouthpiece 48 and an outer wrapper 50. The aerosol-generating substrate 42 comprises a plug of tobacco and the mouthpiece 48 comprises a plug of cellulose acetate fibres.

Figure 3:
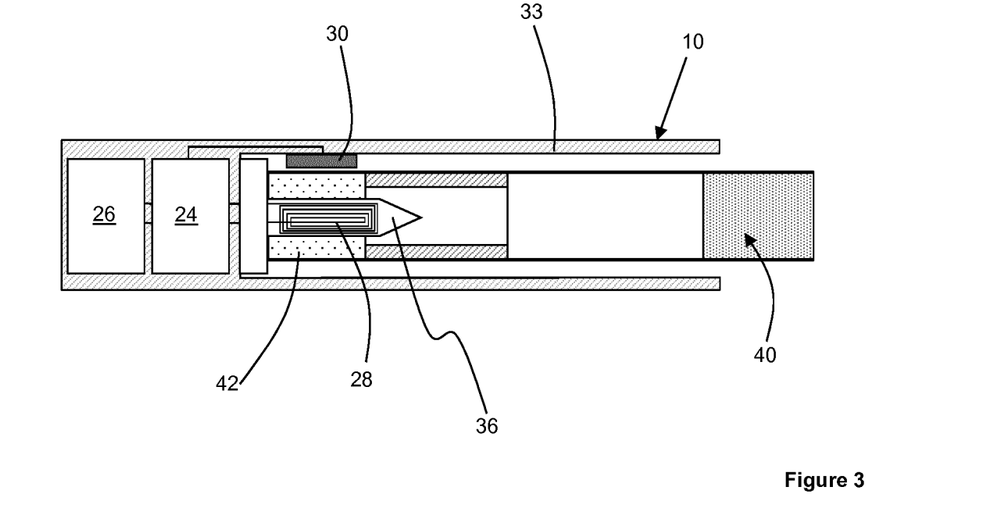
FIG. 3 shows the aerosol-generating device of FIG. 1 combined with the aerosol-generating article of FIG. 2 to form an aerosol-generating system.

FIG. 3 shows the aerosol-generating article 40 inserted into the cavity 14 of the aerosol-generating device 10. Upon insertion of the article 40 into the cavity 14, the heater blade 20 penetrates the aerosol-generating substrate 42 so that a portion of the aerosol-generating substrate 42 is positioned between the first electrode 28 and the second electrode 30.

During use, the controller 24 supplies electrical current from the battery 26 to the resistive heating coil 22 to heat the aerosol-generating substrate 42. During the heating cycle, at least some of the one or more volatile compounds within the aerosol-generating substrate 42 are evaporated, resulting in a change in an electrical load between the first electrode 28 and the second electrode 30, which is measured by the controller 24. When the measured electrical load reaches a predetermined level indicative of a significant depletion of volatile compounds from the aerosol-generating substrate 42, the controller 24 terminates the supply of electrical current from the battery 26 to the resistive heating coil 22 to prevent further heating of the aerosol-generating substrate 42.

Figure 4:
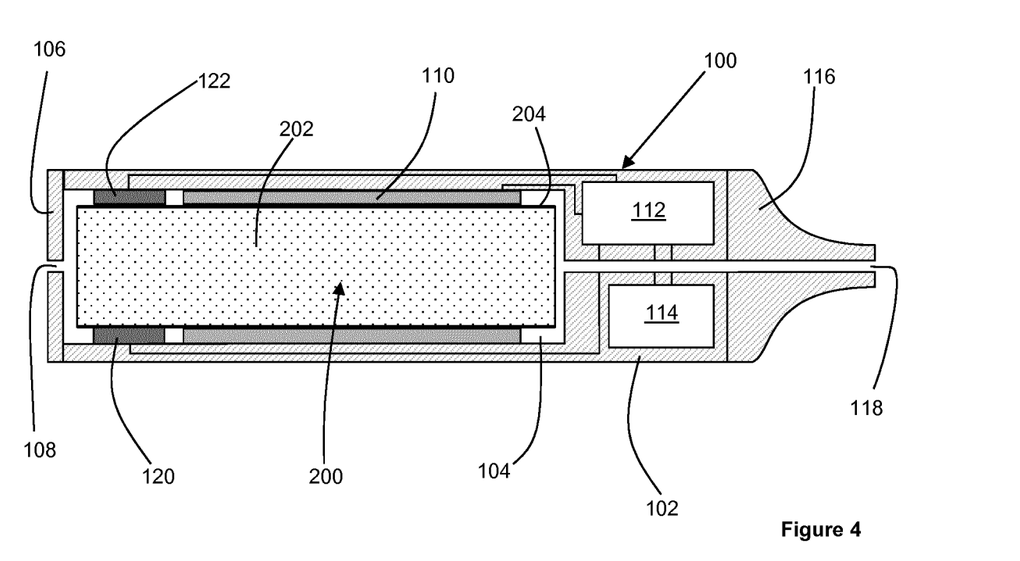
FIG. 4 shows an alternative aerosol-generating system according to the present invention.

FIG. 4 shows an alternative aerosol-generating system in accordance with the present invention and comprising an aerosol-generating device 100 and an aerosol-generating article 200 received within the device 100.

The aerosol-generating device 100 comprises a housing 102 defining a cavity 104 for receiving the aerosol-generating article 200. A removable end cap 106 can be removed to allow insertion of the aerosol-generating article 200 into the cavity 104, the removable end cap 106 comprising an air inlet 108 to admit air into the cavity 104 during use. The device 100 includes an annular heater 110 into which the aerosol-generating article 200 is received. A controller 112 controls the operation of the device 100, including the supply of electrical current from a battery 114 to the annular heater 110. A mouthpiece 116 at a downstream end of the device 100 includes an air outlet 118 to allow a consumer to draw air through the aerosol-generating article 200 and the device 100 during use.

The aerosol-generating device 100 further comprises a first electrode 120 and a second electrode 122 provided at the upstream end of the cavity 104, the first and second electrodes 120, 122 provided opposite each other on opposite sides of the inner surface of the cavity 104. The aerosol-generating article 200, comprising an aerosol-generating substrate 202 wrapped in an outer wrapper 204, is inserted into the cavity 104 so that the upstream end of the aerosol-generating substrate 202 is positioned between the first and second electrodes 120, 122. The aerosol-generating article 200 is also received within the annular heater 110.

During use, the controller 112 supplies electrical current from the battery 114 to the annular heater 110 to heat the aerosol-generating substrate 202. During the heating cycle, at least some of the one or more volatile compounds within the aerosol-generating substrate 202 are evaporated, resulting in a change in an electrical load between the first electrode 120 and the second electrode 122, which is measured by the controller 112. When the measured electrical load reaches a predetermined level indicative of a significant depletion of volatile compounds from the aerosol-generating substrate 202, the controller 112 terminates the supply of electrical current from the battery 114 to the annular heater 110 to prevent further heating of the aerosol-generating substrate 202.

Figure 5:
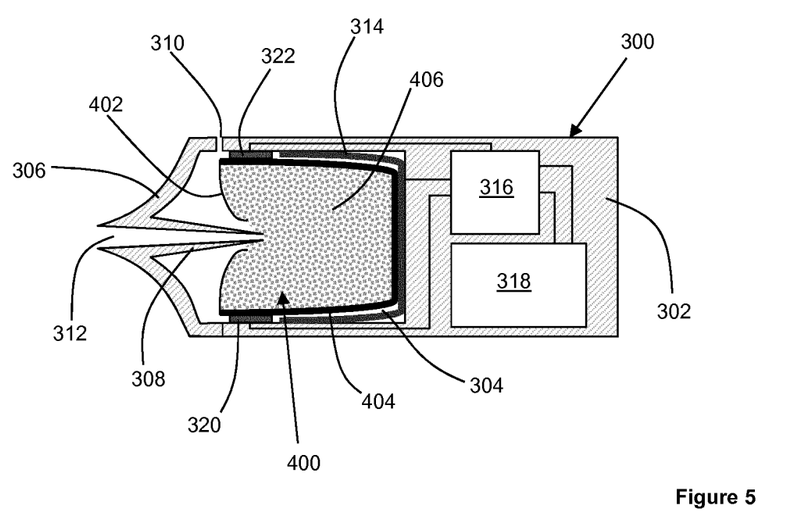
FIG. 5 shows a further alternative aerosol-generating system according to the present invention.

FIG. 5 shows an alternative aerosol-generating system in accordance with the present invention and comprising an aerosol-generating device 300 and an aerosol-generating article 400 received within the device 300.

The aerosol-generating device 300 comprises a housing 302 defining a cavity 304 for receiving the aerosol-generating article 400. A removable mouthpiece 306 can be removed to allow insertion of the aerosol-generating article 400 into the cavity 304, the removable mouthpiece 306 comprising a piercing element 308 for breaking a seal 402 on the aerosol-generating article 400 when the removable mouthpiece 306 is reattached to the housing 302. The removable mouthpiece 306 further comprises an air inlet 310 for admitting air into the cavity 304 and an air outlet 312 extending through the piercing element 308 to allow a consumer to draw air out of the cavity 304 during use.

The device 300 includes an annular heater 314 into which the aerosol-generating article 400 is received. A controller 316 controls the operation of the device 300, including the supply of electrical current from a battery 318 to the annular heater 314.

The aerosol-generating device 300 further comprises a first electrode 320 and a second electrode 322 provided at the upstream end of the cavity 304, the first and second electrodes 320, 322 provided opposite each other on opposite sides of the inner surface of the cavity 304. The aerosol-generating article 400 comprises a capsule 404 sealed at an open end by a seal 402, the seal 402 being pierced by the piercing element 308 when the removable mouthpiece 306 is attached to the housing 302. An aerosol-generating substrate 406 comprising loose tobacco is contained within the capsule 404. In use, the aerosol-generating article 400 is inserted into the cavity 104 so that the upstream end of the aerosol-generating substrate 406 is positioned between the first and second electrodes 320, 322. The aerosol-generating article 200 is also received within the annular heater 314.

During use, the controller 316 supplies electrical current from the battery 318 to the annular heater 314 to heat the aerosol-generating substrate 406. During the heating cycle, at least some of the one or more volatile compounds within the aerosol-generating substrate 406 are evaporated, resulting in a change in an electrical load between the first electrode 320 and the second electrode 322, which is measured by the controller 316. When the measured electrical load reaches a predetermined level indicative of a significant depletion of volatile compounds from the aerosol-generating substrate 406, the controller 316 terminates the supply of electrical current from the battery 318 to the annular heater 314 to prevent further heating of the aerosol-generating substrate 406.

The invention claimed is:

1. An aerosol-generating device, comprising:
   a power supply;
   at least one heater;
   a cavity configured to receive an aerosol-generating article;
   a first electrode and a second electrode spaced apart from the first electrode such that at least a portion of the aerosol-generating article is disposed between the first electrode and the second electrode when the aerosol-generating article is received within the cavity; and
   a controller configured to control a supply of power from the power supply to the at least one heater for heating the aerosol-generating article when the aerosol-generating article is received within the cavity,
   wherein the controller is further configured to measure an electrical load between the first electrode and the second electrode when the aerosol-generating article is received within the cavity, and
   wherein the controller is further configured to terminate the supply of power from the power supply to the at least one heater when the measured electrical load exceeds a predetermined threshold.

2. The aerosol-generating device according to claim 1, wherein the electrical load comprises at least one of a resistive load and a capacitive load.

3. The aerosol-generating device according to claim 1, wherein at least one of the first electrode and the second electrode forms part of the at least one heater.

4. The aerosol-generating device according to claim 3,
   wherein the at least one heater comprises an elongate heater configured for insertion into the aerosol-generating article when the aerosol-generating article is received within the cavity,
   wherein the first electrode forms part of the elongate heater, and
   wherein the second electrode is disposed on an inner surface of the cavity such that the second electrode is disposed between the inner surface of the cavity and an outer surface of the aerosol-generating article when the aerosol-generating article is received within the cavity.

5. The aerosol-generating device according to claim 4, wherein the second electrode has a substantially annular shape such that the second electrode circumscribes at least a portion of the aerosol-generating article when the aerosol-generating article is received within the cavity.

6. The aerosol-generating device according to claim 1,
   wherein the first and second electrodes are disposed on an inner surface of the cavity, and
   wherein the first and second electrodes are positioned opposite each other such that when the aerosol-generating article is received within the cavity, at least a portion of the aerosol-generating article is disposed between the first and second electrodes.

7. The aerosol-generating device according to claim 6, wherein the at least one heater is disposed on the inner surface of the cavity such that the at least one heater is configured to heat an outer surface of the aerosol-generating article when the aerosol-generating article is received within the cavity.

8. An aerosol-generating system, comprising:
   an aerosol-generating device according to claim 1; and
   an aerosol-generating article comprising an aerosol-generating substrate,
   wherein the aerosol-generating substrate is non-liquid at a temperature of 20 degrees Celsius, and
   wherein the aerosol-generating system is configured such that at least a portion of the aerosol-generating substrate forms at least part of the electrical load and is received between the first and second electrodes when the aerosol-generating article is received within the cavity.

9. The aerosol-generating system according to claim 8,
   wherein the aerosol-generating substrate is a dielectric material, and
   wherein the electrical load measured by the controller is a capacitive load.

10. The aerosol-generating system according to claim 8,
    wherein the aerosol-generating substrate is electrically conductive, and
    wherein the electrical load measured by the controller is a resistive load.

11. The aerosol-generating system according to claim 8,
    wherein the aerosol-generating article further comprises a wrapper wrapped around the aerosol-generating substrate, and
    wherein at least a portion of the wrapper forms part of the electrical load.

12. The aerosol-generating system according to claim 11, wherein the wrapper comprises a paper sheet and at least one liquid is sorbed onto the paper sheet.

13. The aerosol-generating system according to claim 8, wherein the aerosol-generating article further comprises a capsule defining a compartment in which the aerosol-generating substrate is received.

14. The aerosol-generating system according to claim 8, wherein the aerosol-generating substrate comprises tobacco.

* * * * *